J. H. WAGENHORST.
WRENCH FOR DEMOUNTABLE RIMS AND THE LIKE.
APPLICATION FILED JUNE 10, 1912.
1,078,567.
Patented Nov. 11, 1913.
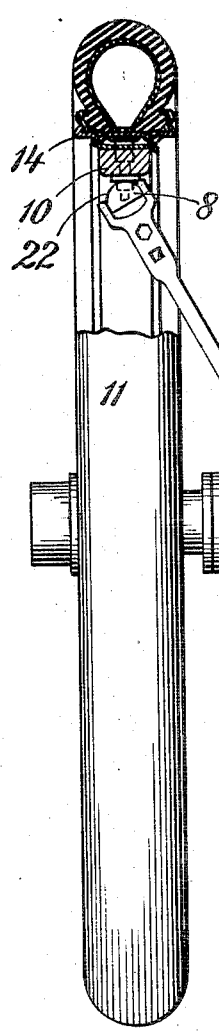
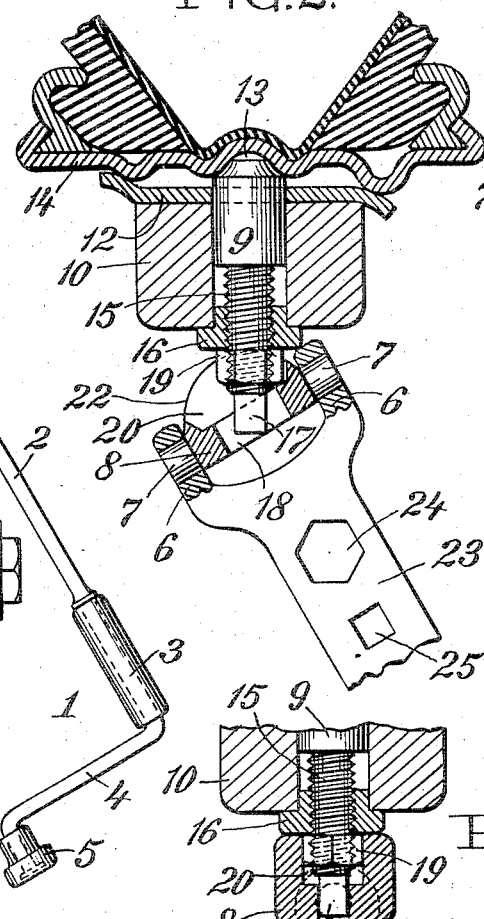
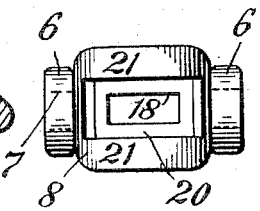
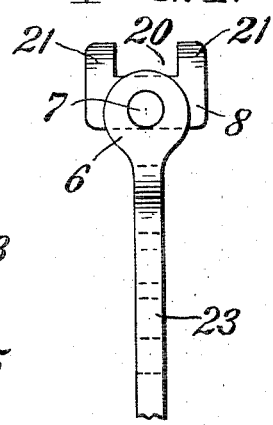
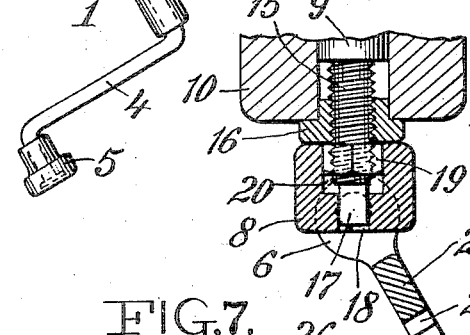
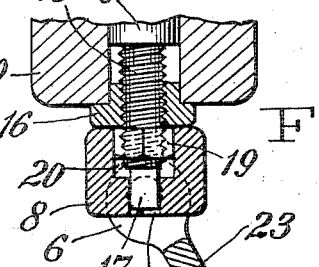
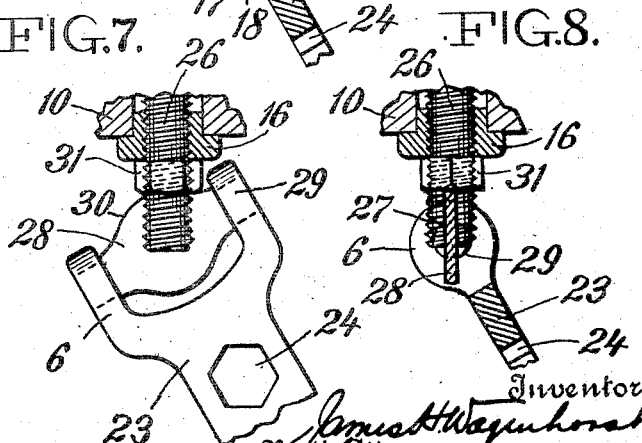
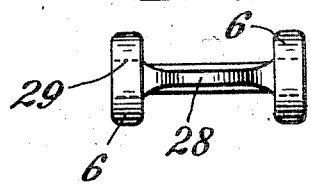

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

WRENCH FOR DEMOUNTABLE RIMS AND THE LIKE.

1,078,567.      Specification of Letters Patent.      Patented Nov. 11, 1913.

Application filed June 10, 1912. Serial No. 702,858.

*To all whom it may concern:*

Be it known that I, JAMES H. WAGENHORST, a citizen of the United States, residing in the city of Akron, county of Summit, and State of Ohio, have invented certain new and useful Improvements in Wrenches for Demountable Rims and the like, of which the following is a specification.

This invention relates to an improved wrench or tool particularly adapted for operating the radial studs used as the securing means in a certain form of demountable rim construction of my invention. In rims of this type the wheel periphery is provided with a seat or seats for the tire-carrying rim, radial studs being carried by the wheel at intervals and extending through the felly into engagement with the under-surface of the rim. Screw-threaded means are provided for adjusting the studs radially to clamp the rim upon the wheel or to release the same therefrom; for example, the studs may be provided with screw-threaded stems screwing through plates fastened to the under-surface of the wheel felly. In this case it will be seen that the studs must be rotated about axes radial to the wheel and that the ordinary brace wrench employed for operating the fastening bolts of demountable rims, when such bolts extend transversely of the wheel felly, cannot be used.

My present invention comprises an improved form of wrench adapted to be operated continuously like a brace wrench, but capable of being used at an angle to the part to be rotated.

In the accompanying drawings which form a part of this specification, Figure 1 is an elevation of a vehicle wheel, a portion of the wheel being shown in transverse section, and showing one form of my improved wrench applied to the head of a radial stud carried by the wheel; Fig. 2 is a transverse section upon an enlarged scale of the base of the tire, the tire-carrying rim, wheel felly and felly band, showing one of the radial studs for securing the rim upon the felly band, and illustrating the end of my improved wrench engaging the head of the radial stud, the socket member of the wrench and the bearings for the trunnions being shown in section; Fig. 3 is a plan view of the end of the wrench; Fig. 4 is an edge elevation of the end of the wrench; Fig. 5 is a transverse sectional view through a portion of the wheel felly and the end of the wrench applied to the radial stud showing the wrench and stud turned from the position shown in Fig. 2 a quarter of a revolution; Fig. 6 is a plan view of the end of a modified form of wrench; Fig. 7 is a view showing the end of the wrench of the form illustrated in Fig. 6 applied to a radial stud; Fig. 8 is a view similar to Fig. 7 showing the wrench and stud turned through a quarter of a revolution, the end of the wrench being shown in section.

Referring to the drawings in detail, and particularly to Figs. 1 to 5, inclusive, the numeral 1 designates my improved wrench which comprises the shank 2 having the handle 3 thereon and the crank arm 4 carrying the handle 5. The end of the shank 2 is formed into a fork having the perforated arms 6. In the holes in these arms are journaled the trunnions 7 of the socket member 8 of the wrench. The shape of the socket in this socket member will depend upon the shape of the bolt-head or nut which it is intended to engage. As shown in the drawings, the wrench is designed to turn a stud 9 passing radially through the felly 10 of a wheel 11.

12 is the felly band of the wheel, which has a hole therein through which the end of the stud passes, the end of the stud being received in a socket 13 formed in the under-surface of the tire-carrying rim 14. The stud 9 has a screw-threaded stem 15 which screws through a plate 16 secured to the wheel felly. The end of the stem 15 is squared to provide a head 17 adapted to be engaged by the wrench. In order to engage this head the socket member of the wrench has an elongated socket 18 formed therein of a width to fit this head. The radial stud may also carry a lock-nut 19 which serves to limit the radial outward movement of the stud and which it is usually desired to maintain in a fixed position on the stud. It is accordingly desirable to form the wrench so that it will rotate the stud and lock-nut together. For this purpose the socket member of the wrench is provided with a second and larger socket 20 to receive the lock-nut. This socket 20 is formed between the side walls 21 of the socket member, the edges of these side walls being preferably convexly curved as indicated at 22 in Fig. 2, and constituting bearing surfaces adapted to contact with the plate 16, if one be used, or its equivalent part. Both the sockets 18 and 20 are sufficiently long to permit the socket member of the wrench to tilt through a considerable angle, preferably somewhere near ninety degrees, about an axis at right angles to the axis of the trunnions 7. When this tilting takes place the lock-nut and head of the stud slide between the walls of their respective sockets, the curved edges of the side walls 21 bearing against the plate 16 and supporting the end of the wrench. It will be seen that by the arrangement described I have secured the action of a universal joint but by a simplication of the parts.

As the operator who support the wrench by means of the handle 3 rotates the same by turning the crank 4, the socket will be turned from the position shown in Fig. 2 to the position shown in Fig. 5. In the latter position the socket member is tilted upon the stud head and lock-nut until the axis of the trunnion 7 is at right angles to the axis of the stud. The socket member is, however, turned upon its trunnions until it is at an angle to the shank of the wrench as shown in Fig. 5. The further rotation of the wrench will bring the parts again into the relative positions shown in Fig. 2, but with the socket member the other side up. Thus it will be seen that during each rotation of the wrench the socket member will slide from one limit of its position upon the nut and stud head to the other limit and back again, while the socket member is simultaneously turning about its trunnions. As the wrench can be applied to the radial stud at an angle as shown in Fig. 1, it can be freely operated from one side of the wheel. By making the shank of the wrench long, the handles for the operator are carried beyond the hub of the wheel and plenty of room for the rotation of the crank arm 4 is provided. It will be understood, of course, that a regular brace for turning the shank may be used if desired. The end of the shank 2 near the fork is preferably flattened, as shown at 23, this flattened portion having sockets 24 and 25 formed therein adapted to engage the lock-nut and the head of the stud, respectively. If it is desired to adjust the nut upon the stud or if the nut or stud becomes rusted, so that an unusual effort is required to turn them, the sockets 24 or 25 may be engaged with the nut or head of the stud, as the case may be, and the nut or stud turned through a limited angle, using the shank of the wrench as a lever arm. After the stud and nut have been started, the wrench may be applied thereto in the usual manner, as shown in Figs. 1 and 2. The socket 25 may also be used, if it is desired to screw up the stud very tight after it has been operated by the socket member of the wrench.

In Figs. 6, 7 and 8 I have shown a modified form of my invention in which the end of the stud 26 is provided with a kerf 27. In this case the wrench carries in its fork a flattened blade 28 adapted to enter the kerf, the blade being mounted upon trunnions 29 which are received in the bearings in the arms 6 of the fork. The blade 28 has a curved edge or bearing surface 30 adapted to bear upon the bottom of the kerf 27 or upon the top of the lock nut 31, if one is used, as the case may be. In this modification frictional engagement with the stud is relied upon to turn the nut, the socket 24 being used to engage the same in case it sticks or requires adjustment. The operation of this form of my wrench is the same in principle as that of the form above described. As the shank of the wrench is turned the blade 28 slides in the kerf in the end of the stud and also pivots upon its trunnions.

While I have described my wrench as particularly applicable to the rotation of radial studs for securing demountable rims upon wheels, I do not wish to limit my invention exclusively to use in that connection, as my wrench obviously may be used advantageously wherever it is necessary to operate at an angle to the axis of rotation of the thing to be turned.

Having thus described certain preferred embodiments of my invention, but without desiring to limit myself to the details set forth any further than as specified in certain of the more limited claims hereunto appended, I claim:

1. A wrench comprising a shank and means for rotating the same, and a member for engaging the article to be turned, said member being pivoted directly to the shank to turn about an axis substantially at right angles thereto, said member being capable of tilting upon the article to be rotated while in engagement therewith, in a plane passing through the axis of the pivotal connection between said member and the shank and through the axis of rotation of the article to be turned.

2. A wrench comprising a shank and means for rotating the same, said shank terminating in a fork, and a member for engaging the article to be rotated pivoted between the arms of said fork, said member having a convexly curved bearing surface, 3. A socket wrench comprising a shank and means for rotating the same, and a socket member pivoted to the end of said shank to turn about an axis substantially at right angles to the shank, said socket member having an elongated socket therein adapted to engage the nut or bolt to be turned between its sides, but to permit tilting of the socket member upon the nut or bolt in a plane passing through the axis of rotation of the nut or bolt.

4. A socket wrench comprising a shank and means for rotating the same, said shank terminating in a fork, and a socket member pivoted between the arms of said fork, said socket member having an elongated socket therein, the outer edges of the side walls of said member being convexly curved.

5. A socket wrench comprising a shank and means for rotating the same, said shank terminating in a fork, and a socket member pivoted between the arms of said fork, said socket member having two superimposed elongated sockets therein, the outer of which is the larger, the outer edges of the side walls of the socket member being convexly curved.

JAMES H. WAGENHORST.

Witnesses:
SEWARD DAVIS,
EDMUND QUINCY MOSES.

Copies of this patent may be obtained for five cents each, by addressing the "Commissioner of Patents, Washington, D. C."